United States Patent [19]

Shiomi

[11] Patent Number: 4,675,517
[45] Date of Patent: Jun. 23, 1987

[54] PHOTOSENSITIVE ELEMENT HAVING SUPPLEMENTARY LIGHT SENSITIVE REGIONS TO CORRECT FOR LIGHT SPOT DIAMETER VARIATIONS

[75] Inventor: Yasuhiko Shiomi, Tokyo, Japan

[73] Assignee: Canon Kabushiki Kaisha

[21] Appl. No.: 708,215

[22] Filed: Mar. 5, 1985

[30] Foreign Application Priority Data

Mar. 7, 1984 [JP] Japan ................. 59-33404[U]

[51] Int. Cl.$^4$ .............................................. G01J 1/20
[52] U.S. Cl. ..................................... 250/201; 354/403
[58] Field of Search ............... 250/201 AF, 201 DF; 354/403; 356/1, 4

[56] References Cited

U.S. PATENT DOCUMENTS 4,381,557  4/1983  Jebens ................. 250/201 DF

Primary Examiner—David C. Nelms
Assistant Examiner—William L. Oen
Attorney, Agent, or Firm—Toren, McGeady and Goldberg

[57] ABSTRACT

A photosensitive element having first and second sensitive regions arranged to receive a light spot in such a way that as the light spot lies astride the boundary therebetween, the ratio of the areas of the two parts of the spot light which are received by the first and second sensitive regions, respectively, varies depending on the received position of the light spot, whereby the received position of the light spot is detected from the variation of the ratio of the outputs of the first and second sensitive regions, wherein an error of variation of the ratio of the outputs of the first and second sensitive regions for the received position of the light spot, which takes place when the diameter of the received spot light is so large as to overrun the first and second sensitive regions, is corrected by providing a supplementary sensitive region surrounding the first or second sensitive region.

22 Claims, 11 Drawing Figures

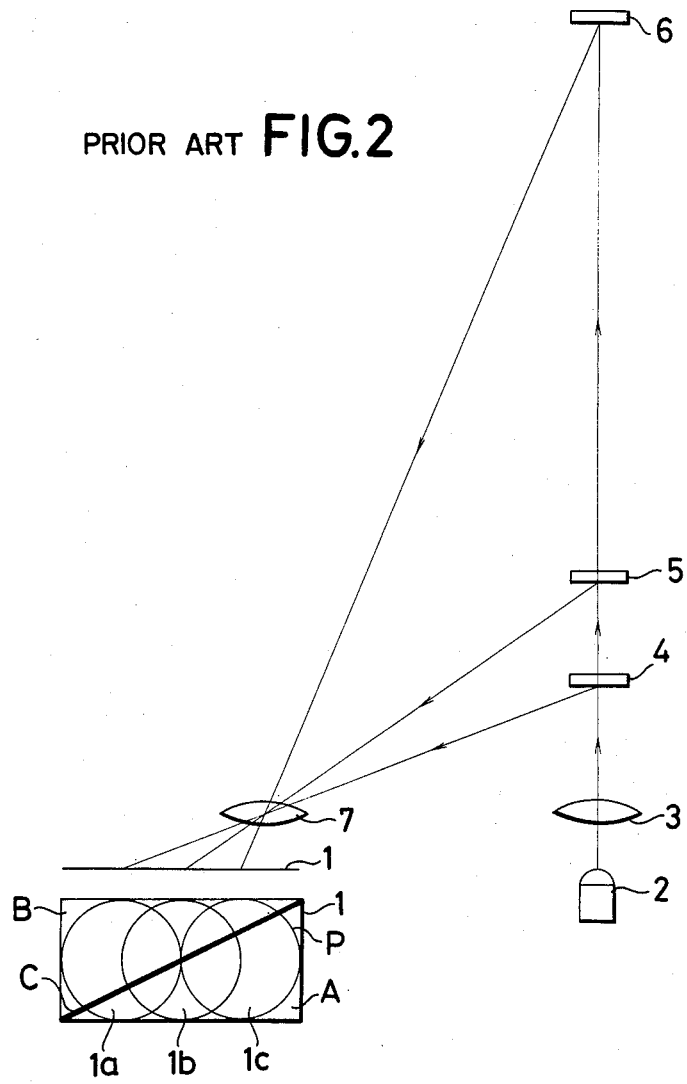

PHOTOSENSITIVE ELEMENT HAVING SUPPLEMENTARY LIGHT SENSITIVE REGIONS TO CORRECT FOR LIGHT SPOT DIAMETER VARIATIONS

BACKGROUND OF THE INVENTION

1. FIELD OF THE INVENTION

This invention relates to active type distance detecting devices, and more particularly to the construction of a light receiving portion of the photosensitive element for detecting the reflection of a projected light spot.

2. Description of the Prior Art

Conventionally, the active type distance detecting device having no moving part includes, for example, the reception of the reflection of a light spot projected from the camera body is received, the received position being related to the distance of an object to be photographed on the basis of the principle of trigonometrical survey, range finding informations thereby being obtained. As an example, U.S. Pat. No. 3,820,129 discloses a distance detecting device wherein a photosensitive element having two independent sensitive regions is used. In the following, its principle is simply explained. FIG. 1 illustrates a photosensitive element 1 of rectangular shape of which the sensitive region is divided into two parts by providing a diagonal insensitive region C of constant width, the areas of the two sensitive regions A and B being exactly equal to each other, and their anodes or cathodes being formed on a common substrate. As shown in FIG. 2, a projected image spot P of round shape, projected by a light projecting element 2 provided in a camera body (not shown), passes through a light protection lens 3 and reflects from an object at a position 4, 5 or 6. The reflection of the projected image spot P is focused on the photosensitive element 1 by a collection lens 7. Because the light projecting element 2 and the photosensitive element 1 are parallel positioned in spacing spaced relation by a constant distance in the direction of the base length, when the object distance varies, the image forming position of the reflection of the projected image spot P on the surface of the photosensitive element moves. Therefore, if this image forming position is detected by some method, it is possible to determine the distance to the object. That is, according to an optical arrangement as shown in FIG. 2, when the object lies at a shorter distance, for example, position 4, the reflection of the projected image spot forms an image in such a position as shown by 1$a$ on the photosensitive element 1. Further, as the object distance increases to positions 5 and 6, the image forming position of the reflection of the projected image spot P moves to 1$b$ and 1$c$, respectively. As the image forming position of the reflection of the projected image spot P changes through 1$a$, 1$b$ and 1$c$, the relative values of the detection output of the sensitive region A and the detection output of the sensitive region B varies with variation of the ratio of the light receiving domain (the term "light receiving domain" herein used means those portions of the sensitive regions which actually receive the reflection of the projected image spot P), or the ratio of the light receiving areas. From these relative values, therefore, the object distance can be determined. Thereby, the value obtained by normalizing the output of the sensitive region A or the output of the sensitive region B by the sum of the outputs of the sensitive regions A and B becomes almost proportional to the axial movement of the focusing lens. Letting the outputs of the sensitive regions A and B be denoted by "a" and "b" respectively, the focusing position of the photographic lens can be controlled by obtaining the value of a/(a+b), or b/(a+b).

And, if the angle of inclination of the aforesaid insensitive region C is determined so that from the prescribed optical condition, a boundary between the shortest and shorter object distances lies at a value for, for example, a/(a+b)=¼, another boundary between the shorter and intermediate object distances at a value for a/(a+b)=½, and still another boundary between the intermediate and farther object distances at a value for a/(a+b)=¾, it becomes possible to determine a correct position of the photographic lens.

However, in actual practice, with the use of such a system, as the diameter of the image of the reflection of the projected image spot P changes at random, or the optical position deviates, the above-defined object distance boundaries are caused to shift largely. For example, when the starting point of the optical arrangement is taken at an object distance for a/(a+b)=½, as shown in FIG. 3(A), on the basis of a certain diameter of the image of the reflection of the projected image spot P, the boundary position (a/(a+b)=¼) between the shortest and shorter object distances, and the boundary position (a/(a+b)=¾) between the intermediate and farther object distances can be found to be equal to desired values of object distance. This enables the inclination of the insensitive region C to be set. As shown in FIG. 3(b), however, when the actual diameter of the image of the reflection of the projected image spot becomes larger than that, despite the image of the reflection of the projected image spot P shifting by the same quantity on the surface of the photosensitive element 1, the amount of variations of the outputs "a" and "b" becomes small. As a result, the actual object distance for a/(a+b)=¼ becomes shorter than the prescribed one, and the actual object distance for a/(a+b)=¾ conversely becomes farther. Also when the actual diameter of the image of the reflection of the projected image spot P becomes small, the amount of variations of the outputs "a" and "b" becomes large. As a result, the actual object distance for a/(a+b)=¼ becomes farther than the prescribed one, and the actual object distance for a/(a+b) ¾ becomes shorter than the prescribed one.

SUMMARY OF THE INVENTION

An object of the present invention is to provide a photosensitive element having first and second sensitive regions arranged to receive a light spot in such a way that as the light spot lies astride the boundary therebetween, the ratio of the areas of the two parts of the light spot which are received by the first and second sensitive regions, respectively, varies depending on the received position of the light spot, whereby the received position of the aforesaid light spot is detected from the variation of the ratio of the outputs of the first and second sensitive regions, wherein an error of variation of the ratio of the outputs of the aforesaid first and second sensitive regions for the received position of said light spot, which takes place when the diameter of the received light spot is so large as to overrun the aforesaid first and second sensitive regions, is corrected by providing a supplementary sensitive region surrounding the aforesaid first or second sensitive region, so that distance detection can be performed always accurately.

Other objects of the invention will become apparent from the following description of an embodiment thereof.

BRIEF DESCRIPTION OF THE DRAWINGS

FIGS. 1 and 2 are schematic views illustrating the principle of the conventional distance detecting device.

DETAILED DESCRIPTION OF THE PREFERRED EMBODIMENT

The present invention will next be described in connection with an embodiment thereof by reference to the drawings.

Figure 3A:
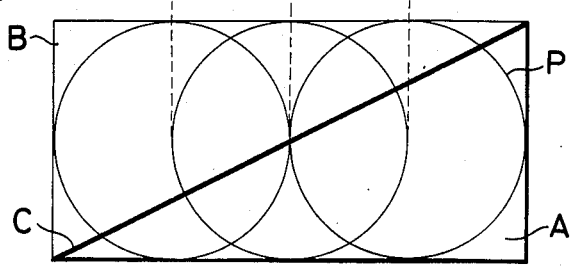
FIGS. 3(a) to 3(c) are diagrams taken to explain the drawbacks of the conventional photosensitive element.
Figure 3B:
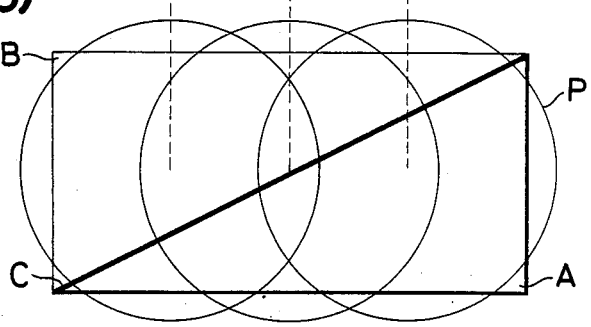
Figure 3C:
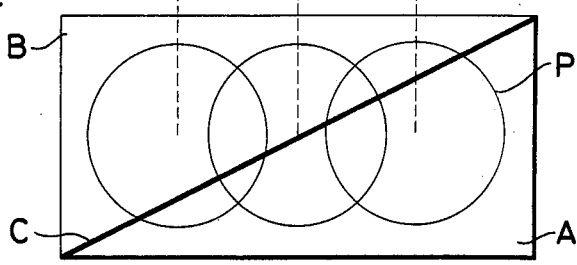
Figure 4A:
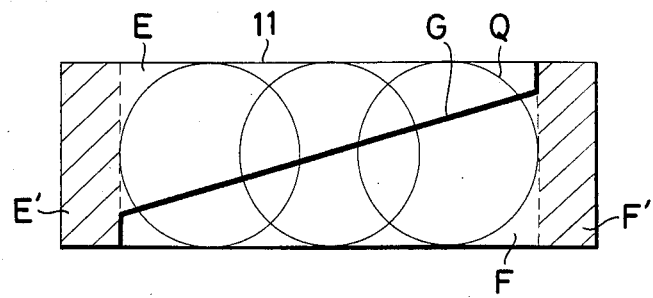
FIGS. 4(a) to 4(d) are schematic views illustrating the construction of a photosensitive element according to the present invention.
Figure 4B:
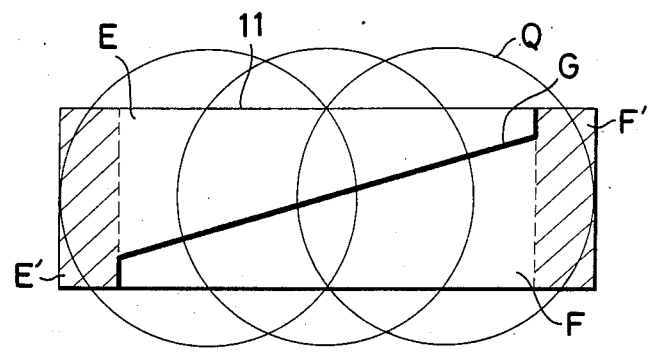

FIGS. 4(a) to 4(d) illustrate the construction of a photosensitive element of the distance detecting device according to the present invention. In FIG. 4(a), 11 is a photosensitive element (for example, SPC) having two independent sensitive regions E and F with an insensitive region G therebetween and arranged so that the ratio of the light receiving areas varies with variation of the light received position. By the same principle as in FIG. 2, therefore, the distance can be detected by using this element 1. Here, the inclination of the insensitive region G is determined so that for the minimum diameter of the image formed with the reflection of the projected image spot Q as the standard, the relative values of the outputs of the sensitive regions E and F vary depending on prescribed values of the object distance. Next, when the diameter of the image formed with the reflection of the projected image spot Q becomes so large as to overrun the sensitive regions E and F as shown in FIG. 4(b), the amount of variation of an operation value $e/(e+f)$ or $f/(e+f)$ between outputs "e" and "f" of the sensitive regions E and F is decreased. Therefore, the actually detected value of the object distance largely deviates from the prescribed one. For this reason, on the farther distance side, a supplementary sensitive region E' for expanding the sensitive region E is provided at the hatched portion E', i.e. at the left end of the photosensitive element 11. On the shorter distance side, another supplementary sensitive region F' for expanding the sensitive region F is provided at the hatched portion F', i.e. at the right end of the photosensitive element 11. Thereby, the amount of variation of the operation value $e/(e+f)$ or $f/(e+f)$ can be increased.

Figure 4C:
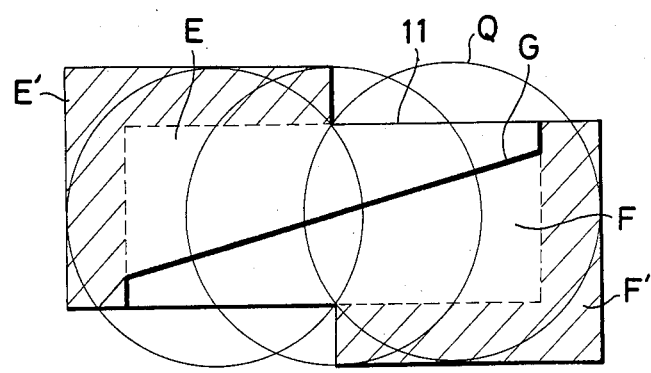
Figure 4D:
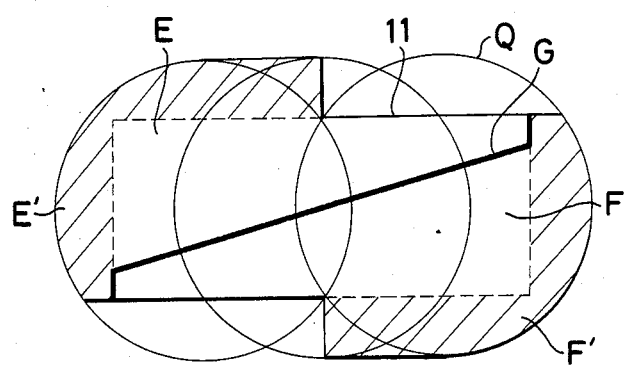

Further, as shown in FIG. 4(c), for the sensitive region E at the left and upper portions, and for the sensitive region F at the right and lower portions, supplementary sensitive regions E' and F' may be added to increase the amount of variation of the operation value $e/(e+f)$ or $f/(e+f)$ even when the diameter of the image formed with the reflection of the projected image spot Q becomes large. Also, the form of the supplementary sensitive regions E' and F' is not necessarily limited to the angular shape, but may be changed to a round shape in conformance to the maximum possible diameter of the image formed with the reflection of the projected image spot Q as shown in FIG. 4(d). Because, in this case, the areas of the corners of the otherwise formed supplementary region of rectangular shape can be omitted without having to influence the output, the influence of the direct current saturation by sun light can be advantageously moderated.

In short, the present invention is to provide the two sensitive regions, of which one of the light receiving areas for the image spot of minimum diameter increases, while the other decreases, as the image spot moves in one direction, with supplementary sensitive regions arranged adjacent the aforesaid sensitive regions to expand the light receiving area of the one of the sensitive regions which receives a larger proportion of the light spot depending on the light receiving position. So long as this feature is satisfied, the supplementary sensitive region provided adjacent the aforesaid sensitive region may take any form.

Figure 5:
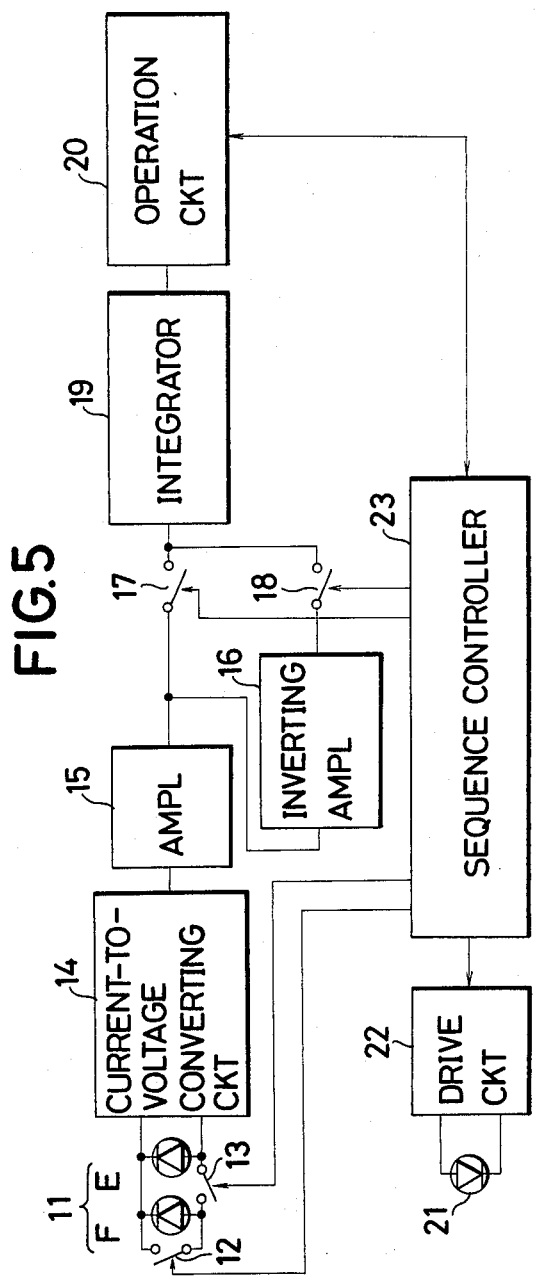
FIG. 5 is a block diagram illustrating the circuit construction of a distance detecting device employing the photosensitive element of FIGS. 4(a) to 4(b).
Figure 6:
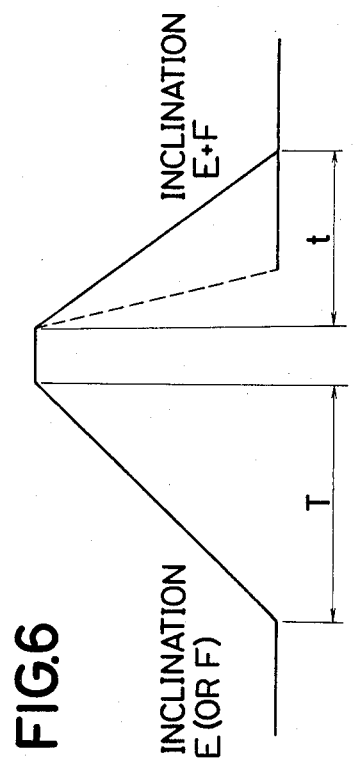
FIG. 6 illustrates a manner in which the circuit of FIG. 5 operates.

Next, by reference to FIGS. 5 and 6, the circuitry of a distance measuring device using the photosensitive element 11 of FIGS. 4(a) to 4(d) is described.

FIG. 5 illustrates the construction of the circuit elements of the distance measuring device according to the present invention. In the drawing, in the initial state, a switch 12 is closed, and another switch 13 is open. Therefore, one of the above-described two sensitive regions E+E' (the combination of E and E') and F+F' (the combination of F and F'), in this instance, the former of E+E' is rendered operative to detect the output of the light projecting element (for example, iRED). The signal current produced from the sensitive region E+E' is converted to a voltage by a circuit 14, and, after having been amplified by an amplifier 15, is inverted by an inverting amplifier 16. The outputs of the amplifier 15 and inverting amplifier 16 are alternately sampled by switches 17 and 18, the operation of which are controlled by a sequence controller 23 in synchronized timing with the recycling of energization of the light projecting element 21 driven by a drive circuit 22. In particular, the output of amplifier 15 is applied to an input of an integrator 19 in which an ascending integration is carried out for a predetermined time as shown in FIG. 6. At the termination of this predetermined time, the switch 12 is opened and the switch 13 is closed, thereby both of the two sensitive regions E+E' and F+F' are rendered operative to detect the reflection of the projected image spot from the light projecting element 21. By shifting the phase timing of the switches 17 and 18 by 180° by the sequence controller 23 the output of inverting amplifier 16 is applied to integrator 19 and, a descending integration is carried out in the integrator 19. Letting T denote the certain predetermined time of the ascending integration, "t" the time for which the descending integration is carried out until the level from which the ascending integration started, is reached, and, $e+e'$ and $f+f'$ the outputs of the two sensitive regions E+E' and F+F', we have $t=(e+e')T/[(e+e')+(f+f')]$. If "t" is evaluated for a given value of T, a value of $(e+e')/[(e+e')+(f+f')]$ can be obtained. This operation is performed by an operation circuit 20. For note, the ascending integration may alternatively be carried out at the value of the regions F+F'. Then, from $t=(f+f')T/[(e+e')+(f+f')]$, the value of $(f+f')/[(e+e')+(f+f')]$ may be obtained.

As has been described above, the present invention is to provide a photosensitive element having first and second sensitive regions arranged to receive a light spot in such a way that as the light spot lies astride the boundary therebetween, the ratio of the areas of the two parts of the right spot which are received by the first and second sensitive regions, respectively, varies depending on the received position of the light spot, whereby the received position of the aforesaid light spot is detected from the variation of the ratio of the outputs of the first and second sensitive regions, wherein an error of variation of the ratio of the outputs of the aforesaid first and second sensitive regions for the received position of said light spot, which takes place when the diameter of the received light spot is so large as to overrun the aforesaid first and second sensitive regions, is corrected by providing supplementary sensitive region surrounding the aforesaid first or second sensitive region. Therefore, this produces a great advantage that even when the diameter of the light spot changes, the relationship between the variation of the ratio of the outputs of said first and second sensitive regions and the light receiving position remains unchanged so that always accurate distance detection can be assured.

What is claimed is:

1. In a photosensitive element having first and second light sensitive regions arranged to receive a light spot projected by a light projecting device and reflected by an object in such a way that as said light spot lies astride a boundary therebetween, the ratio of areas of two parts of said light spot which are received by said first and second light sensitive regions, respectively, varies depending on the received position of said light spot, whereby the received position of said light spot can be detected from a ratio of outputs of said first and second light sensitive regions, the improvement comprising:

supplementary light sensitive regions arranged adjacent to and extending said first and said second light sensitive regions, respectively, for receiving a portion of said light spot overrunning said first or second light sensitive regions, respectively, so that said ratio of the outputs of said first and said second light sensitive regions, along with said supplementary light sensitive regions, does not change from the value representative of the received position of said light spot due to a size of said light spot to be received being so large as to overrun said first or second light sensitive region.

2. In a photosensitive element having a substantially rectangular shaped light sensitive portion comprising first and second light sensitive regions with a substantially diagonal boundary therebetween, wherein a light spot, projected by a light projecting device and reflected by an object, is received across said boundary, and when an incident position of said light spot moves in a direction parallel to a long side of said light sensitive portion, the incident position of said light spot in the direction parallel to the long side of said light sensitive portion, is detected from the ratio of outputs of said first and said second light sensitive regions, the improvement comprising:

supplementary light sensitive regions for receiving respective portions of the light spot overrunning said first and second light sensitive regions, respectively, when said light spot is of such a size as to overrun said first or said second sensitive region, said supplementary light sensitive regions being arranged adjacent said first and second light sensitive regions respectively, to extend said first and second light sensitive regions, whereby any shift of the ratio of the outputs of said first and said second light sensitive regions for the incident position of said light spot resulting from the fact that the size of said light spot is so large as to overrun said first or said second sensitive region, is compensated for by said supplementary light sensitive regions.

3. A photosensitive element according to claim 2, wherein
said supplementary light sensitive regions include first and second supplementary light sensitive regions for extending said first and said second sensitive regions, respectively.

4. A photosensitive element according to claim 3, wherein
said first and said second supplementary light sensitive regions are arranged adjacent said first and said second sensitive regions, respectively.

5. A photosensitive element according to claim 4, wherein
said first and said second supplementary light sensitive regions are arranged so as to further extend the one of said first and said second sensitive regions which has a larger light receiving area ratio of said light spot.

6. A photosensitive element according to claim 5, wherein
said first and said second supplementary light sensitive regions are positioned adjacent to short sides of said light sensitive portion.

7. A photosensitive element according to claim 5, wherein
said first and said second supplementary light sensitive regions are positioned adjacent to the long sides of said light sensitive portion.

8. A photosensitive element according to claim 7, wherein
further and said second supplementary light sensitive regions are positioned adjacent to the short sides of said light sensitive portion.

9. A photosensitive element according to claim 8, wherein
said further first and said second supplementary light sensitive regions include intermediate regions connecting the first and second supplementary light sensitive regions, which are positioned adjacent to the long sides of said light sensitive portion, with the further first and second supplementary light sensitive regions which are positioned adjacent to the short sides of said light sensitive portion.

10. A photosensitive element according to claim 9, wherein
said intermediate regions are rounded in conformance with a shape of said light spot.

11. A photosensitive element according to claim 2, wherein
said supplementary light sensitive regions are arranged so as to widen the ratio of the areas of parts of said light spot which are received by said first and said second light sensitive regions, respectively.

12. A distance detecting device for detecting the distance to an object, comprising:
first optical means;
a light projecting device for projecting light through said first optical means to said object to be reflected thereby;
second optical means; and
a photosensitive element for receiving a light spot formed by said second optical means from said projected light reflected by said object, said photosensitive element having first and second light sensitive regions arranged to receive said light spot in such a way that as said light spot lies astride a boundary therebetween, the ratio of areas of two parts of said light spot which are received by said first and second light sensitive regions, respectively, varies depending on the received position of said light spot, whereby the received position of said light spot can be detected from a ratio of outputs of said first and second light sensitive regions, said photosensitive element further comprising:

supplementary light sensitive regions arranged adjacent to and extending said first and said second light sensitive regions, respectively, for receiving a portion of said light spot overrunning said first or second light sensitive regions, respectively, so that said ratio of the outputs of said first and said second light sensitive regions, along with said supplementary light sensitive regions, does not change from the value representative of the received position of said light spot due to a size of said light spot to be received being so large as to overrun said first or second light sensitive region.

13. A distance detecting device, for detecting the distance to an object, comprising:

first optical means;

a light projecting device for projecting light through said first optical means to said object to be reflected thereby;

second optical means;

a photosensitive element for receiving a light spot formed by said second optical means from said projected light reflected by said object, said photosensitive element having a substantially rectangular shaped light sensitive portion comprising first and second light sensitive regions with a substantially diagonal boundary therebetween, wherein said light spot is received across said boundary and when an incident position of said light spot moves in a direction parallel to a long side of said light sensitive portion, the incident position of said light spot, in the direction parallel to the long side of said light sensitive portion, is detected from the ratio of outputs of said first and said second light sensitive regions said photosensitive element further comprising:

supplementary light sensitive regions for receiving respective portions of the light spot overrunning said first and second light sensitive regions, respectively, when said light spot is of such a size as to overrun said first or said second sensitive region, said supplementary light sensitive regions being arranged adjacent said first and second light sensitive regions, respectively, to extend said first and second light sensitive regions, whereby any shift of the ratio of the outputs of said first and said second light sensitive regions for the incident position of said light spot resulting from the fact that the size of said light spot is so large as to overrun said first or said second sensitive region, is compensated for by said supplementary light sensitive regions.

14. A distance detecting device as claimed in claim 13, wherein said supplementary light sensitive regions include first and second supplementary light sensitive regions for extending said first and said second sensitive regions, respectively.

15. A distance detecting device as claimed in claim 14, wherein said first and second supplementary light sensitive regions are arranged adjacent said first and said second sensitive regions, respectively.

16. A distance detecting device as claimed in claim 15, wherein said first and said second supplementary light sensitive regions are arranged so as to further extend the one of said first and said second sensitive regions which has a larger light receiving area ratio of said light spot.

17. A distance detecting device as claimed in claim 16, wherein said first and said second supplementary light sensitive regions are positioned adjacent to short sides of said light sensitive portion.

18. A distance detecting device as claimed in claim 16, wherein said first and second supplementary light sensitive regions are positioned adjacent to the long sides of said light sensitive portion.

19. A distance detecting device as claimed in claim 18, wherein further first and said second supplementary light sensitive regions are positioned adjacent to the short sides of said light sensitive portion.

20. A distance detecting device as claimed in claim 19, wherein said further first and said second supplementary light sensitive regions include intermediate regions connecting the first and second supplementary light sensitive regions, which are positioned adjacent to the long sides of said light sensitive portion, with the further first and second supplementary light sensitive regions which are positioned adjacent to the short sides of said light sensitive portion.

21. A distance detecting device as claimed in claim 20, wherein said intermediate regions are rounded in conformance with a shape of said light spot.

22. A distance detecting device as claimed in claim 13, wherein said supplementary light sensitive regions are arranged so as to widen the ratio of the areas of parts of said light spot which are received by said first and said second light sensitive regions, respectively.

* * * * *